Dec. 17, 1963 P. T. DURST 3,114,813
TEMPERATURE RESPONSIVE CONTROL DEVICE
Filed Jan. 15, 1960 2 Sheets-Sheet 1

INVENTOR.
Paul T. Durst
BY
Andrew K. Hubbard
Atty.

Dec. 17, 1963   P. T. DURST   3,114,813
TEMPERATURE RESPONSIVE CONTROL DEVICE
Filed Jan. 15, 1960   2 Sheets-Sheet 2

INVENTOR.
Paul T. Durst
BY
Andrew G. Hubbard
Atty.

United States Patent Office 3,114,813
Patented Dec. 17, 1963

3,114,813
TEMPERATURE RESPONSIVE CONTROL DEVICE
Paul T. Durst, Brookfield, Ill., assignor to General
Electric Company, a corporation of New York
Filed Jan. 15, 1960, Ser. No. 2,739
5 Claims. (Cl. 200—140)

This invention relates to control devices such as electric thermostats, and, in particular, relates to a control device having a simplified and highly effective means for establishing a desired amount of contact separation as the control device operates from a closed to an open circuit position.

It is well known in the art relating to electric temperature control and pressure control devices which embody fixed electric contacts arranged to be engaged or disengaged by movable contacts as the device responds to changes in external temperature or pressure, that it is advantageous to establish the distance which the movable contacts separate from the fixed contacts at the minimum consistent with the electrical load traversing the contacts. Obviously, if the amount of contact separation is too little, conditions may result in the drawing of a continuous arc between them; and in conventional control devices in which the separation is effected by a snap-action created by an overthrow spring, an excessive contact separation results in sluggish and erratic action.

Prior to the present invention, the amount of contact separation has been established by means of adjustment screws and the like mounted on a cover plate for the control device. The cover plate had to be in place before the screw adjustment could be made. Accurate adjustment was, therefore, difficult, for the workman was handicapped by the essentially "blind" nature of the operation, and considering the mass production speed at which the control devices are manufactured, it was seldom that a uniform contact separation could be had throughout a single production run. This lack of uniformity complicated the later stage of calibration of the control devices and frequently the deficiencies in adjustment produced unsatisfactory operation of the control devices in the field.

It is an object of the present invention, therefore, to provide a control device in which mechanism accurately establishing the extent of the separation of contacts can be placed within the thermostat housing itself at the early stage of manufacture when the fixed contacts are positioned therein.

It is another object of the invention to provide in a control device a contact separation limiting member which may be accurately gauged relative to the fixed contacts thereof—all as a part of the operation fixing the contacts within the housing.

It is a further object of the invention to provide in a control device a contact separation limiting member which can be accurately related to the fixed contacts of the device at a stage of manufacture prior to the insertion of other control elements whereby the contact separation limiting member may be established under optimum manufacturing conditions.

In a presently preferred embodiment of my invention, a molded thermostat housing is accurately formed with slots to receive the spade-like terminal portions of fixed contact elements arranged in a cluster of four for cooperation with a pair of bridging contacts to establish a double pole, single throw electrical system. The cluster is disposed about another slot arranged to receive a blade-like body portion of the contact separation limiting member. The contact elements initially fit slidably but snugly in the slots which are precisely vertical to the base of the housing. The actual contact portions of the contact elements are at right angles to the terminal portions, thus being parallel to the base of the housing. Similarly, the body portion of the contact separation limiting member fits snugly within a vertical slot in the housing base and a hook portion extends at right angles therefrom. The contact elements and the limiting member are placed in the appropriate slots, whereupon a setting tool is brought down urging the contacts and the setting device against die elements which align the contact surfaces in a precise plane and establish the hook portion of the limiting device in desired space relation to the plane of the working surface of the contacts. At the same time, the die operation stakes the contact body portions and that of the limiting member securely in fixed relationship in the housing. The contact elements are additionally made secure by the action of small wedge elements formed on the blade portions thereof which during the setting operation are driven against a wall of the associated housing slots.

The movable contacts are carried by an insulating member mounted on the actuating blade. Said member is provided with an aperture of exact dimension through which the hook of the limiting member projects. The engagement of the lower edge of the aperture with the hook establishes the extent of separation of the contacts as the blade operates them to an open circuit position. The several cooperating elements are easily made to accurate dimensions and shape, for they are all manufactured by punch press or die cutting operations and the ease and the accuracy of the assembly, as above described, insures the desired contact separation relationship within a tolerance totaling only a few thousandths of an inch.

Other features and advantages will be appreciated from the following detailed description of a presently preferred embodiment of the invention, read in connection with the accompanying drawings in which.

Figure 1:
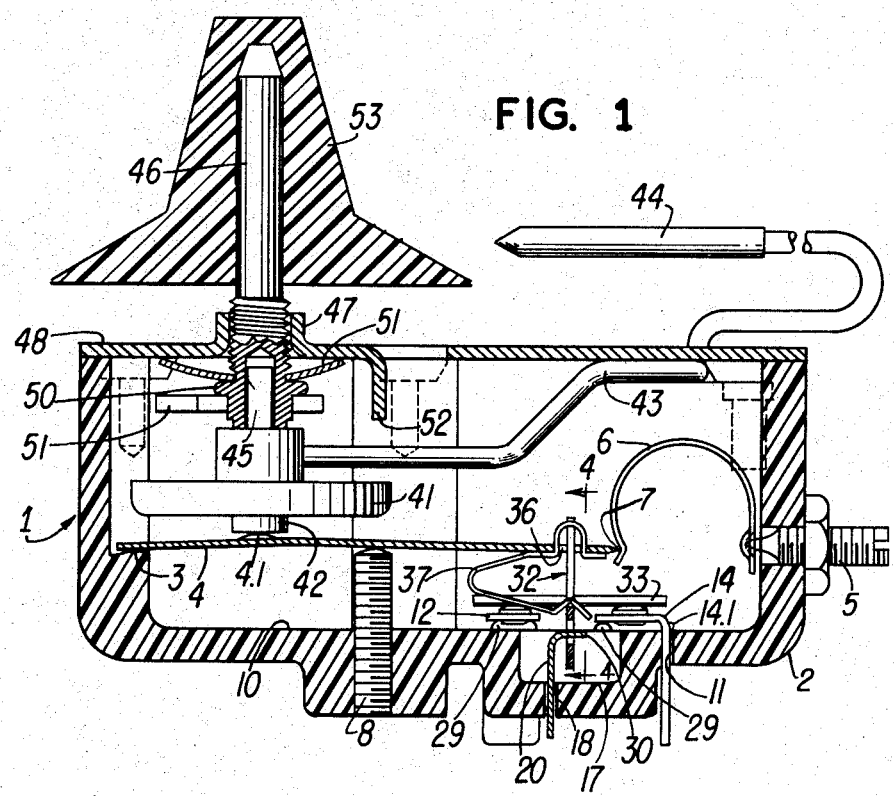
FIG. 1 is a side sectional elevation of a control device embodying my invention.
Figure 2:
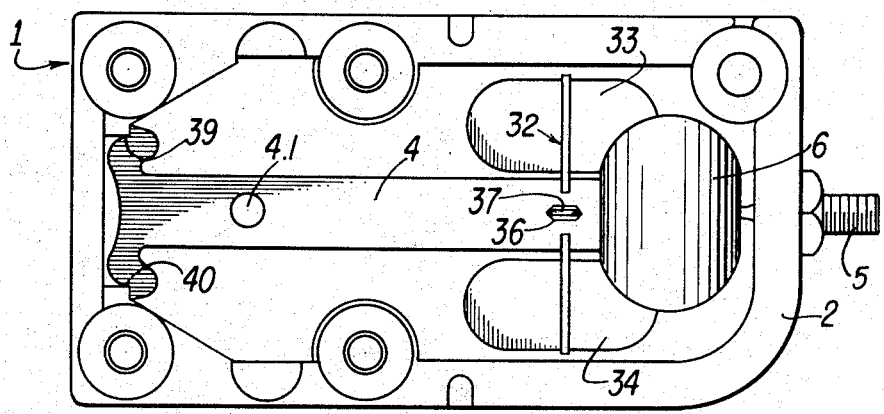
FIG. 2 is a plan view of the housing portion of the device with the closure plate and the expansion system removed.
Figure 3:
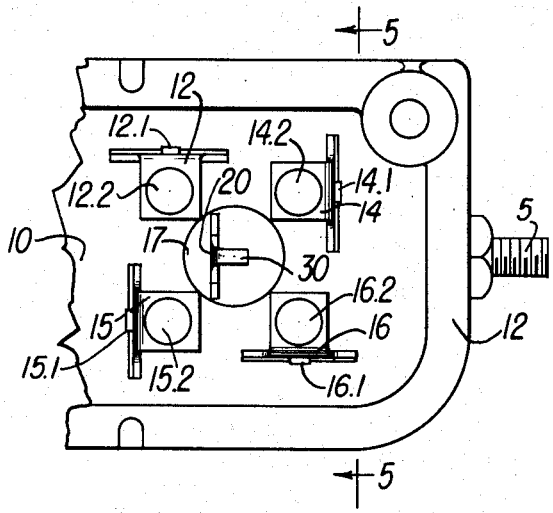
FIG. 3 is a fragmentary plan view of the housing of the control device showing the arrangements of the contacts and the contact separation limiting members.

Referring now to FIG. 1, the invention is illustrated in its application to a temperature control device. Accordingly, the thermostat 1 comprises a housing 2 molded from a phenol-formaldehyde condensation product such as "Bakelite." The housing is formed with a ledge 3 providing a fulcrum point for the flexible actuating blade 4 (best shown in FIG. 2). The housing also has means for accommodating the amplitude adjustment screw 5 which, as well known in the art, represents a pivot point for a U-shaped snap spring 6 interposed between the conical end of screw 5 and the knife edge end 7 of the blade 4. The housing also accommodates the fulcrum screw 8 which provides one of the flexure points for the blade 4. Further, the housing base 10 is formed with slots such as the slot 11 precisely vertical to the plane of the base. There are four such slots arranged as indicated in FIG. 3 to accommodate aligned pairs of fixed contacts 12, 14, 15, 16. Said contacts cooperate with bridging members to establish a single throw, double pole electrical switching system, as later described. The housing also has a cup-like portion 17 having a slot 18 which accommodates the body portion of the contact separation limiting device 20. It will be understood that the body portions of the several contacts and the limiting device are spade-like—that is to say, are flat and broad relative to their thickness—and fit tightly within the associated slots, but with sufficient initial freedom to permit the respective body portions to be inserted therethrough.

Figure 5:
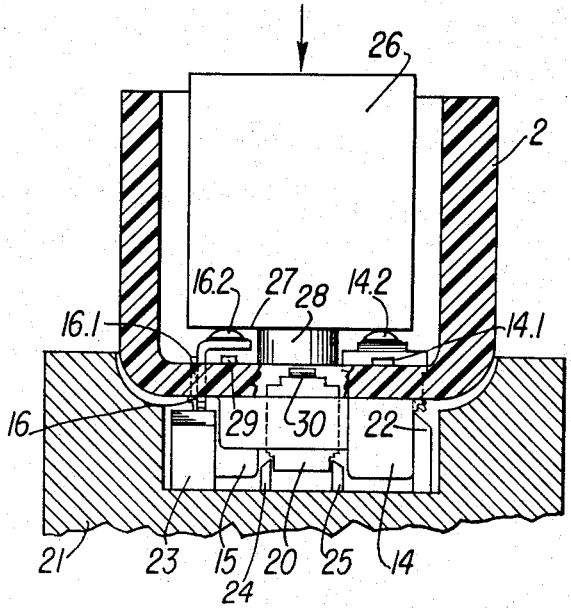
FIG. 5 is a somewhat schematic showing of the operation of setting and securing the contact elements and limiting device.

As schematically shown in FIG. 5, the housing 2 with the contacts 12, 14, 15, and 16, and the separation limiting member 20 in position, is placed in the bed 21 of a press structure having a plurality of pairs of upsetting blades such as the blades 22 and 23 which are shown in association with the contacts 14 and 16, and the blades 24 and 25 which operate on the limiting member 20. With the apparatus as shown in FIG. 5, the ram 26 and its extension 28 are brought downwardly against the contacts and the member 20 urging them collectively down until the offset shoulders thereof engage the associated blades in the press bed. Then, by means of a further downward ram movement of controlled extent, the blades upset the shoulder portions of the contacts and the member 20 urging them in an outward direction, as indicated in dotted line with respect to contact 14, to key the same into secure engagement with the housing. As a further means for precisely aligning the four contact members, the base of the housing is provided with four precisely dimensioned lugs beneath the overhanging portions of the contacts. Two such lugs 29 are shown in FIG. 1. Additionally to stabilize the contacts within the housing, each contact is formed with an integral wedge such as the wedges 14.1 and 16.1 shown in connection with the contacts 14 and 16. As the contacts are driven downwardly by the ram 26, the wedges bear against the housing. It will be apparent that the base 27 of the ram establishes the contact portions 12.2, 14.2, 15.2 and 16.2 in a common plane parallel to the base 10 of the housing, and that the amount of the extension 28 below the base 27 exactly establishes the vertical spacing between the surface of the said contact portions and the hooked portion 30 of the member 20—all as a part of the setting of the contact members and the member 20. The ram 26 is withdrawn from the housing without disturbing the setting of the respective contact elements and the member 20. This is considered to be one of the important aspects of the invention, for it enables the separation of the contacts to be established within close tolerances and with little possibility of human error.

Figure 4:
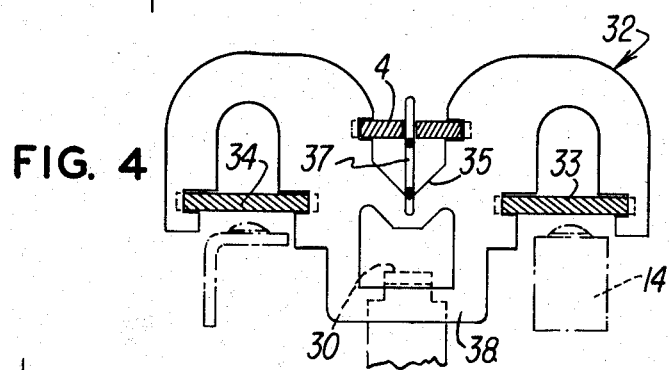
FIG. 4 is an enlarged elevation of the contact carrier, looking in the direction of the arrows 4—4 of FIG. 1, showing the actuating blade in section, and a typical relationship of the bridging contacts to the fixed contacts when in open circuit position.

The blade 4 mounts adjacent the end 7, the contact carrier 32, best shown in FIG. 4, which supports the bridging contacts 33, 34. The carrier 32 is die-cut from a relatively thin plate of insulation material. Symmetrically with respect to the notch 35, the carrier is notched to receive the blade 4. It will be understood that the blade 4 is also notched whereby the blade and carrier are readily secured together in a manner permitting a degree of rotation of the carrier in directions axially of the blade. In similar fashion, the wings of the carrier are notched to interfit with the notched bridging contacts whereby said contacts are capable of limited adjustability relative to the fixed contacts. As appears in FIGS. 1 and 2, the blade 4 is pierced at 36 to accommodate the spring 37 by means of which the carrier is stabilized relative to the blade. A V-shaped portion of the spring straddles the carrier 32 at the base of the notch 35 and short horizontal portions of the spring engage beneath the blade 4, as clearly appears in FIG. 1. In this fashion, the carrier is disposed in a normally vertical relationship to the blade 4.

The downwardly extending loop portion 38 of the carrier is disposed within the cup 17 of the housing and receives the hook-like extremity 30 of the contact separation limiting member 20. An advantage of this limiting member is that the blade and contact carrier assembly may be positioned in the housing with the spring 6 engaging the end of the blade 4, and the extremity 30 of the member 20 engaging with the carrier, to retain the blade and its associated elements as a subassembly in position within the housing before the remaining components are placed therein. The spring 6 exerts an end thrust on blade 4, whereupon its extremities 39 and 40, FIG. 2, seat against the adjacent wall of the housing. This subassembly is so stable because of the engagement of the hook 30 with the carrier 32 that it may be freely handled during the next stage of manufacture which entails the positioning of the condition-responsive structure.

As is well known in the art, the blade 4 is under an initial tension brought about by the amplitude adjustment screw 5 and the blade is actuated in snap-action fashion by the axial effort applied by the expansion of a diaphragm member 41 against the blade. Similarly, the blade 4 operates in snap-action fashion in the opposite direction as the diaphragm member 41 retracts relative to the blade and the blade tends to assume its initial biased condition. For accuracy, the blade is dimpled as at 4.1, FIG. 1, and a cylindrical head 42 of the diaphragm is axially aligned therewith. Assuming the contacts to be in closed circuit position, the downward movement of head 42 will flex the blade 4 between the shoulder 3 and the screw 8, resulting in an upward movement of the end 7 of the blade. As the blade passes through the overcenter position of spring 6, the blade will snap upwardly until its movement is arrested by the engagement of the hook 30 with the wall of the carrier loop 38. In the open circuit position, therefore, the bridging contacts are sure to have the desired separation from the fixed contacts. If the diaphragm should then retract from the blade, the reverse action of the blade occurs and the end 7 of the blade will snap downwardly. The depth of the loop 38 of the carrier is much greater than the downward movement of the bridging contacts so that the upper edge of the loop opening will not bottom on the hook 30. It will be seen, therefore, that neither the contact members nor the contact separation limiting member are subjected to any heavy axial strains, whereby the initial adjustment of the fixed contacts and the contact separation limiting member will remain throughout the life of the control device.

In the illustrated form, the diaphragm 41 is served by the capillary tube 43 and bulb 44, which, when charged with a suitable liquid or vapor, causes the diaphragm 41 to expand or contract according to the increase or decrease in temperature change experienced by the bulb 44. As is well known in the art, the same situation prevails when the device is adapted for use as a pressure control device, except that the tube system is open at its end and is subjected only to pressure changes of the device under control.

The diaphragm 41 is nonrotatably mounted in the housing and is arranged for axial adjustment relative to the blade 4. As shown, the diaphragm has a pilot 45 which enters into an axial bore of the adjustment shaft 46, the male thread portion of which cooperates with the female threaded neck 47 of the cover plate 48. The circular shoulder 50 serves as a seat for the spherical spring washer 51 which introduces a frictional restraint on the rotation of shaft 46, thus maintaining the selected adjustment. A stop 51 fixed on shaft 46 limits the rotation of the shaft by engaging a tongue 52 extending downwardly from the cover plate 48, whereupon the full range of axial adjustment of the diaphragm is accomplished in a shaft rotation of about 350 degrees. A knob 53 is provided to facilitate this adjustment. It will be understood that the base of shaft 46 bears rotatively against the diaphragm, whereby the diaphragm moves axially against the inherent bias of blade 4.

While there has been described what is at present considered to be the preferred embodiment of the invention, it will be understood that various modifications may be made therein, and it is intended to cover in the appended claims all such modifications as fall within the scope of the invention.

I claim:

1. Control apparatus, comprising a housing, electrical contact elements disposed therein in a plane having a fixed relation to a reference plane, a blade member disposed within said housing with one end of said blade member in spaced relation to said contact elements, means for effecting movement of said blade end toward or away from said contact elements, a carrier plate extending transversely of said blade adjacent said end, means for securing said plate thereto to provide for limited pivotal movement of said plate while normally establishing said plate vertical to the plane of said blade end, contact means attached to said plate for engagement with or separation from said fixed contact elements according to the direction of movement of said blade relative thereto, said plate having an aperture providing a wall disposed in predetermined spaced relation to the plane of said contact means, a rigid hook member extending from said housing through said aperture for engagement with said wall, and means for fixing said hook member in predetermined relation to said reference plane whereby upon a movement of said plate away from said fixed contact elements, said hook member will engage with said wall to precisely establish the extent of separation of said contact means from said fixed contact elements.

2. Control apparatus, comprising a housing, electrical contact elements disposed therein in a plane having a fixed relation to a reference plane, a blade member disposed within said housing with one end of said blade member in spaced relation to said contact element, means for effecting movement of said blade free end toward or away from said contact elements, a carrier plate extending laterally from said blade end, means for securing said plate thereto to provide for limited pivotal movement of said plate while normally establishing said plate in uniform angular relationship to the plane of said blade end, contact means attached to said plate and extending substantially parallel to the plane of said fixed contact elements for engagement therewith or separation therefrom according to the direction of movement of said blade relative thereto, said plate having an aperture having a wall disposed in predetermined spaced relation to the plane of said contact means, a rigid hook member extending from said housing through said aperture for engagement with said wall, and means for fixing said hook member in predetermined relation to said reference plane whereby upon a movement of said plate relative to said fixed contact elements, said hook member will engage with said wall to precisely establish the movement of said contact means relative to said fixed contact elements.

3. Control apparatus, comprising a housing having a base and end walls, fixed contact elements in said base, a flexible blade member disposed in substantially parallel spaced relation to said base, overthrow spring means interposed between one end of said blade and one of said housing walls and exerting a longitudinal effort to seat the opposite end of said blade member against the opposite housing end wall, said spring means being arranged to move the adjacent end of said blade member toward or away from said contact elements with a snap action and the assembly of said spring means and blade member within said housing being maintained solely by the said longitudinal effort of said spring means, a plate of insulation material fixed to said blade member adjacent said spring means and extending substantially vertically of said blade member, contact means carried by said plate for cooperation with said fixed contact elements, said plate having an aperture, and a hook member fixed to said base and extending through said aperture, the size of said aperture relative to said hook member being such that movement of said blade member away from said contact elements will be interrupted before disassembly of said blade member and said spring means can occur.

4. Control apparatus, comprising a housing, electrical contact members disposed therein in a plane having a fixed relation to a reference plane, a flexible blade member within said housing, means for mounting said blade member to position a free end thereof in overlying relation to said contact members, means responsive to change in a physical condition to move said free end toward or away from said contact members, a carrier plate extending transversely of said blade member free end and secured thereto in interfitting relation therewith to provide for limited pivotal movement, spring means disposed between said blade member and said plate for maintaining said plate normally vertical to the plane of said blade member, movable contact members for cooperation with said fixed contact members, means for attaching said movable contact members to said carrier plate, means on said plate providing a wall member in fixed spaced relation to the level of attachment of said movable contact members, and rigid means fixed to said housing in predetermined relation to said reference plane, said rigid means extending into overlapping relation with said carrier plate wall to be engaged thereby upon movement of said plate in a predetermined direction relative to said fixed contact members, thereby to precisely limit the extent of such movement.

5. Control apparatus according to claim 4 in which said carrier plate has a V-shaped central portion to accommodate said blade member and wing members extending oppositely therefrom to accommodate said movable contact members, and the area of engagement of said rigid member with said carrier plate is centered relative to said blade member and said movable contact members.

References Cited in the file of this patent

UNITED STATES PATENTS

| | | |
|---|---|---|
| 1,405,260 | Beavers | Jan. 31, 1922 |
| 1,686,506 | Anthony | Oct. 9, 1928 |
| 2,157,156 | Abendroth | May 9, 1939 |
| 2,283,795 | Dahl | May 19, 1942 |
| 2,611,845 | Miller | Sept. 23, 1952 |
| 2,758,178 | Eskin | Aug. 7, 1956 |
| 2,762,888 | Jacobs | Sept. 11, 1956 |
| 2,877,539 | Kinnan | Mar. 17, 1959 |
| 2,944,324 | Moyer | July 12, 1960 |